United States Patent [19]

Potchen et al.

[11] 4,243,464
[45] Jan. 6, 1981

[54] LAMINATING METHOD

[76] Inventors: Thomas M. Potchen; Jessie M. Potchen, both of 2909 Banchory Rd., Winter Park, Fla. 32792

[21] Appl. No.: 873,266

[22] Filed: Jan. 30, 1978

[51] Int. Cl.³ ............................................. B31F 5/00
[52] U.S. Cl. .................................. 156/324; 156/238; 156/540; 156/555
[58] Field of Search ............ 144/309 A, 309 B, 309 Y, 144/309 R, 317, 320 R, 320 A, 321, 324, 327, 328; 156/555, 583, 238, 241, 311, 282, 312, 324, 540–542

[56] References Cited

U.S. PATENT DOCUMENTS

| | | | |
|---|---|---|---|
| 1,902,032 | 3/1933 | Horine | 144/320 X |
| 2,070,600 | 2/1937 | Jenett | 156/282 X |
| 2,409,785 | 10/1946 | Newmark et al. | 144/327 X |
| 2,433,965 | 1/1948 | Upson | 156/555 X |
| 2,643,475 | 6/1953 | Klopfenstein | 156/583 X |
| 2,665,735 | 1/1954 | Steffenino | 156/235 |
| 3,006,799 | 10/1961 | Adams | 156/312 X |
| 3,618,646 | 11/1971 | Lewis | 144/320 X |
| 3,623,933 | 11/1971 | Staats | 156/555 X |
| 3,767,510 | 10/1973 | Gustafson | 156/555 X |
| 3,994,769 | 11/1976 | Gersbeck | 156/555 X |
| 3,998,683 | 12/1976 | Benton | 156/555 X |
| 4,051,882 | 10/1977 | Hasegawa | 144/309 D |

OTHER PUBLICATIONS

"Dry Transfer Printing: will it replace other decorative surfaces", Furniture Manufacturing Management, Mar. 1979.

Primary Examiner—David A. Simmons
Attorney, Agent, or Firm—Duckworth, Hobby, Allen & Pettis

[57] ABSTRACT

A laminating machine and the method incorporated therein includes a pair of opposing and substantially parallel cylindrical steel rollers defining a continuous pressure line between the outer cylindrical surfaces thereof. A sheet is fed between the rollers in a first direction substantially transverse to the pressure line, and a film to be laminated is fed onto the sheet surface and with the sheet in the first direction. A fluid pressure cylinder-lever arm arrangement is provided with one of the rollers for applying relative pressure between the two rollers along the pressure line during passage of the film-sheet combination therebetween, the pressure being in an amount sufficient to compress the sheet to effect complete bonding of the film to the sheet surface, but in an amount less than that which causes structural damage to the sheet. The outer surface of one of the rollers is heated during the laminating process.

21 Claims, 3 Drawing Figures

LAMINATING METHOD

BACKGROUND OF THE INVENTION

1. Field of the invention

The present invention relates to machines and methods for laminating thin decorative films onto sheet material.

2. Description of the Prior Art

Furniture products having a wood-grain exterior appearance are highly accepted by the purchasing public. However, the cost of manufacturing such furniture from wood has become prohibitively expensive.

An entire industry has developed around the manufacture and use of thin polyester carrier sheets adhered to a film having a wood-grain appearance printed thereon and provided with an adhesive. The film is laminated to the surface of the sheet of material which is a cheap substitute for wood, such as fiberboard, hardboard, particle board, plastic, cheaper woods and in some cases, even metal.

The ability to laminate these films onto large sheets, on the order of two feet in width or greater, has proven to be less than satisfactory. These efforts have also been unsuccessful especially where such attempts have been coupled with large volume manufacturing techniques employing a plurality of conventional rubber roller pairs using relatively low pressures of less than 50 lbs. per lineal inch, in order to prevent compression damage to the sheet material being laminated.

Of course, it will be understood that decorative patterns other than wood-grain are often employed with the film lamination techniques used in the prior art.

SUMMARY OF THE INVENTION

The present invention is based in part upon the realization that heated, incompressible pressure members operating at high pressure levels may be employed to laminate the thin decorative film to a sheet while the sheet is under compression.

Apparatus in accordance with the present invention, and the method incorporated therein, contemplates a pair of opposing members, each member disposed so as to define a continuous pressure line therebetween. Means are provided for moving one of the members toward and away from the other member so as to permit variation of the space between the two members. Means are also provided for feeding the film to be laminated and the sheet into the space between the two pressure members in a first direction which is substantially transverse to the pressure line, and with the film onto the surface to which it is to be laminated. Means are further provided for applying pressure between the two members in an amount substantially above 50 lbs. per linear inch along the pressure line and against the film-sheet combination, in order to effect the desired bonding of the film to the sheet without destroying the sheet. Further means are also provided for heating the film-sheet combination while between the members.

In a preferred embodiment of the present invention, the pressure members comprise a pair of cylindrical parallel rollers having a hardness which is substantially equal to that of steel. Suitably, the rollers are hollow, and the heating means comprises means for circulating a heating fluid in at least one of the hollow rollers to heat the periphery thereof, in order to heat the adhesive along the polyester sheet - decorative film combination film to effect a complete bonding and lamination of the film to the sheet.

In a facile construction of the apparatus in accordance with the present invention, pressure is applied to the rollers by the use of a pair of lever arms, with one of the rollers being rotatably supported by the lever arms. The other roller is mounted on a frame, to which the pair of lever arms is rotatably pinned. The other end of the lever arms are moved toward and away from the frame by the use of a fluid pressure cylinder arrangement.

THE DRAWING

DETAILED DESCRIPTION

A preferred embodiment of the present invention will now be described with reference to FIGS. 1 and 2. Apparatus in accordance with the present invention, referred to generally as 10, includes a pair of parallel cylindrical steel rollers 12, 14, disposed so as to define a continuous pressure line 13 therebetween.

Figure 1:
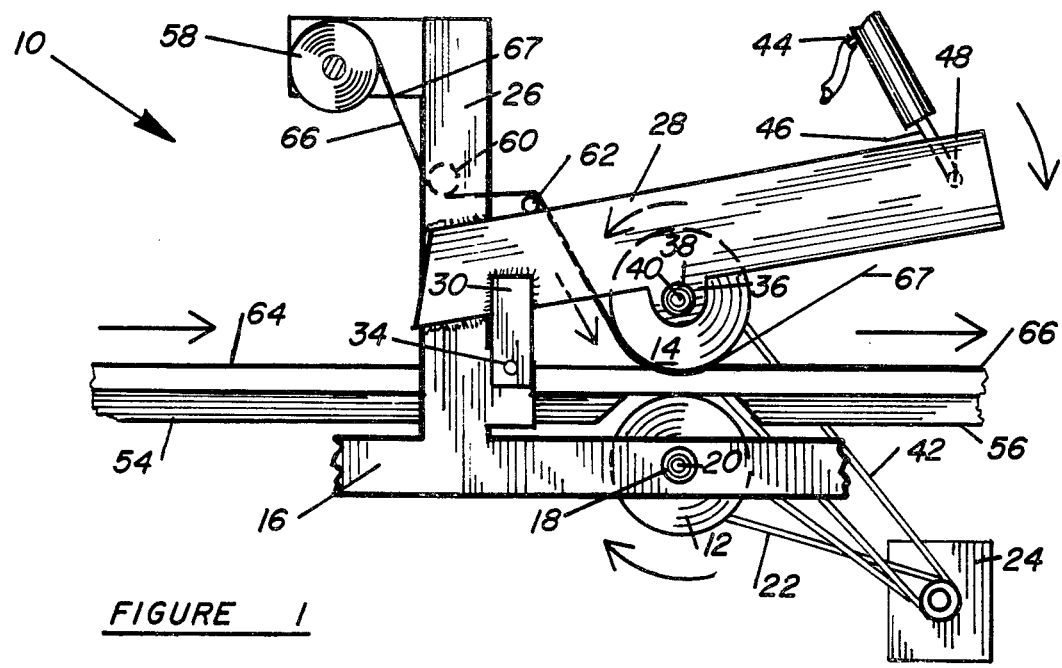
FIG. 1 is a side view of a laminating machine in accordance with the present invention.

The first roller 12 is rotatably supported by a frame member 16, the roller 12 including a bearing 18 on opposing sides of the roller, it being understood that a corresponding frame 16 on the side opposing the side shown in FIG. 1 is used to rotatably support the roller 12 in a conventional manner. As will be understood below with the description of the second roller 14 as shown in FIG. 2, both rollers 12, 14 are hollow to permit a heating fluid to be injected therein for purposes of heating the cylindrical periphery thereof. To this end, the roller 12 is provided with a heating fluid port 20 extending through the bearing 18. It will be understood that a corresponding port on the opposing side of the roller 12 is provided to permit flow through that roller. The cylindrical roller 12 is driven by a motor 24 via a chain 22 in a conventional manner.

The second roller 14 is supported above the first roller 12 in a manner which permits the space between the two rollers to be controlled, while maintaining relative pressure between those two rollers. To accomplish this, the apparatus 10 is provided with a riser 26 extending integrally from the frame 16. With continued reference to both FIGS. 1 and 2, the apparatus 10 further includes a pair of lever arms 28 which are pivotably coupled to the frame 16 by way of a pivot arm 30, the pivot arm being pivotably coupled at 34 to the respective lever arm 28 and to a bracket coupled to the riser 26, and thus, to the frame 16.

The second roller 14 is further provided with a pair of bearings 38 each on an opposing end thereof, and each bearing 38 being supported by a bearing block 36 which is coupled to the underside of a corresponding one of the lever arms 28. As with the roller 12, the roller 14 is provided with heating fluid ports 40. The roller 14 is adapted to be driven by the motor 24 via a chain 42.

Noting the upper right-hand portion of FIG. 1, the apparatus 10 is provided with a fluid pressure cylinder, for example an air cylinder 44 having a piston 46 which is adapted to be driven out of the cylinder 44 under fluid pressure in a conventional manner. The extremity of the piston 46 is coupled by a pivot 48 to each of the lever arms 28 in order to permit changes in the spacing between the rollers 12, 14 and to determine the relative pressure between those two rollers along the pressure line 13 therebetween, as will be described in greater detail below.

Figure 2:
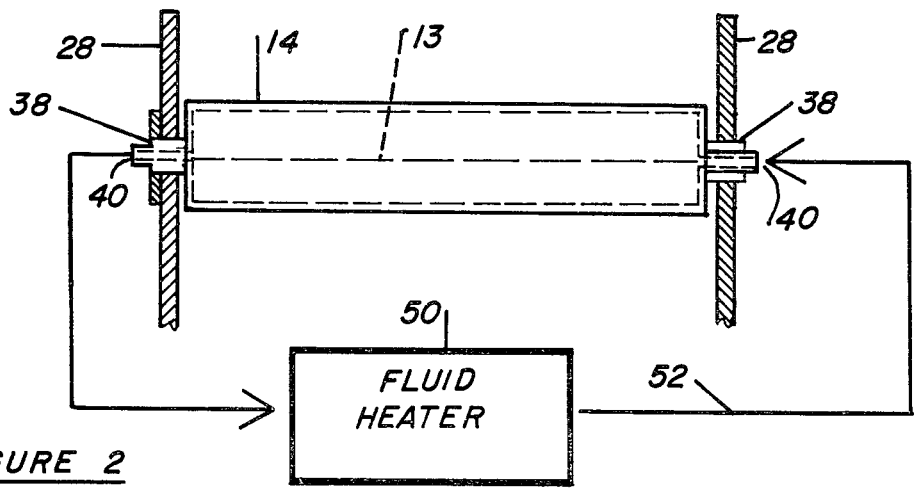
FIG. 2 is a top view of a portion of the apparatus shown in FIG. 1, further including a schematic illustration of the heating system incorporated therein.

Referring now to FIG. 2, the apparatus 10 includes a fluid heater 50 and a feed and return line 52 coupled between the fluid heater ports 40 on the respective sides of each of the rollers 12, 14 in order to permit the flow of a heating fluid into each hollow roller 12, 14 in a continuous flow so as to permit heating of the outer cylindrical surface thereof.

Referring again to FIG. 1, the apparatus 10 is provided with a sheet feeding table 54, 56 which permits the feeding of the sheet material 64 into the space between the rollers 12, 14 in a conventional manner. Likewise, the apparatus 10 is provided with a laminate film feeding arrangement, which includes a film supply roller 58, and a pair of guide rollers 60, 62 which allow the film to pass across one of the heated rollers 14 and thereafter into the space between the two rollers and across the surface of the sheet material 64 to which the film 66 is to be laminated. The polyester carrier sheet 67 is carried away in a conventional manner.

Use of the apparatus 10 in accordance with the present invention will now be described.

As noted previously, the rollers 12, 14 are a substantially incompressible material and preferably comprise steel. Initially, the rollers 12, 14 are separated a distance which is slightly less than the thickness of the sheet material 64 to which the film 66 is to be laminated. Thereafter, the sheet material 64 is fed into the space between the rollers 12, 14 while the rollers are being heated by the fluid from the heater 50 and while the rollers 12, 14 are being rotated by operation of the motor 24. Simultaneously, a pressure is exerted by the fluid pressure cylinder 44 in a sufficient amount to insure that the pressure applied between the rollers 12, 14 and against the film-sheet combination 66, 64 is in an amount which is substantially greater than 50 lbs. per lineal inch along the pressure line 13. However, it is likewise necessary to insure that the amount of pressure being exerted between the rollers 12, 14 along the prressure line 13 against the film-sheet combination 66, 64 is less than that which causes structural damage to the sheet 64; to this end, it has been found that maintaining the pressure at amounts less than 400 lbs. per lineal inch along the pressure line 13 will avoid any structural damage to the compressible sheet materials of the type described above.

As is shown in FIG. 1, a slight compression of the sheet material 64 takes place along the pressure line 13 between the rollers 12, 14. It has been found that this slight compression of the sheet material 64 effects a more complete lamination of the film 66 to the surface of the sheet 64 than has heretofore been achieved with lower pressures and multiple rollers pairs constructed of compressible materials. While some compression deformation of the sheet 64 takes place during passage between the rollers 12, 14, so long as the amount of pressure exerted by the fluid pressure cylinder 44 is controlled as described above to insure that no permanent structural deformation or destruction of the sheet material takes place, then the desired complete bonding in accordance with the present invention is obtained.

An important aspect of the present invention is the realization of the complete lamination of the film 66 to the sheet 64 by utilizing a much simpler and less expensive machine than has heretofore been available.

Figure 3:
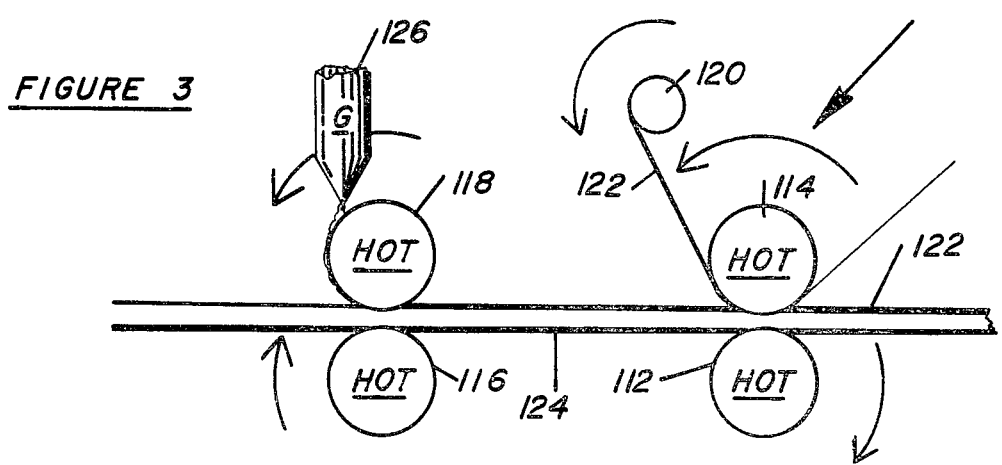
FIG. 3 is a side view illustrating another embodiment of apparatus in accordance with the present invention.

An alternate form of the present invention is shown in FIG. 3 and described with reference thereto.

THe alternate embodiment, referred to generally as 110, includes a pair of parallel, opposed steel cylindrical rollers 112, 114 essentially identical to the rollers 12, 14 described above with reference to FIGS. 1 and 2. The rollers 112 and 114 are likewise heated in the manner previously described, and are driven so as to rotate in the directions indicated by arrows associated therewith.

Another pair of opposing cylindrical steel rollers 116, 118 is provided upstream from the first pair of rollers 112, 114. As with the other rollers previously described, the rollers 116, 118 are driven in the manner shown by the associated arrows and are heated. Both pair of rollers 112, 114 and 116, 118 are provided with a lever arm-fluid pressure cylinder arrangement like that associated with roller 14 of FIG. 1, in order to control the spacing between the roller pairs and to apply a pressure between about 50 to 400 lbs. per lineal inch along the pressure line between the adjacent rollers.

In use, the machine 110 receives a sheet of material 124 between the first pair of rollers 116, 118. A glue reservoir 126 feeds glue onto the hot roller 118, which is then pressed evenly across the upper surface of the sheet material 124. It will be noted that a slight deformation of the sheet material 124 may take place between the rollers 116, 118.

Thereafter, the sheet material 124 is fed between the second roller pair 112, 114 while at the same time a laminating film 122 is fed from a supply roller 120 across the upper hot roller 114 and across the surface of the sheet material 124. Compression of the sheet material 124 takes place between the rollers 112, 114 in a manner similar to that described above with reference to the rollers 12, 14 of FIGS. 1 and 2, thus insuring a complete lamination of the film 122 to the sheet material 124. Thus, the laminating film 122 is completely bonded to the surface of the sheet 124 as desired.

While it has been described above that both of the rollers 12, 14 shown in FIG. 1 may be provided with means for heating the cylindrical surfaces thereof, it will be understood by those skilled in the art that where relatively thick sheet materials are to be laminated, it is sufficient to heat only the side to which the film 66 is to be laminated. On the other hand, when relatively thin sheets, such as metals, are to be laminated, then it is feasible to utilize both rollers 12, 14 in order to heat both sides of the sheet. In those cases where only one roller is to be heated, customarily the top roller 14 would be utilized.

In order to accomplish the lamination of the film 66 as desired, it is preferred that the temperature of the surface of the cylindrical rollers 12, 14 be elevated by the fluid from the heater 50 to a temperature substantially above 300 degrees Fahrenheit, and preferably in the range of 375 degrees to 425 degrees Fahrenheit. It will be understood by those skilled in the art that insufficient temperature will result in a poor bond, while a temperature which is too high causes damages to the thin decorative film 66 which is to be laminated to the surface of the sheet 64.

Another important aspect of the present invention will be described with reference to FIG. 1.

Certain types of the compressible wood fiber sheet materials described above, notably particle board, fiberboard and porous woods (such as plywood) are shipped from the manufacturers with a rough, highly porous finish. In the past, it has been difficult to laminate the thin decorative films onto these rough, porous surfaces in a satisfactory manner because the adhesive is too rapidly absorbed into the material, or the decorative film makes a poor bond to the rough finish, or both.

It has been found that successful lamination of these films onto materials having a rough, porous finish may be obtained by first running such sheet materials through the heated incompressible pressure rollers 12, 14 of FIG. 1 prior to the step of laminating the decorative film thereon. The resulting intermediate product has a smooth, calendared finish which is virtually non-porous with respect to the starting sheet material. While the effect of this heat and pressure treatment on the rough, porous sheet material during passage through the rollers 12, 14 is not completely understood, it is believed that the heat causes the naturally occurring resins in the sheet material to become amorphous at the sheet surface, while the pressure of the rollers 12, 14 serves to smooth the amorphous resins which are immediately hardened after passage between the rollers. In any event, the resulting output of sheet material is extremely smooth and non-porous with respect to the input sheet.

The effect of this initial treatment on the porous-finish sheet materials provides two important advantages. First, it has been found that the subsequent lamination of a thin decorative film (such as the film 66 in FIG. 1) onto a sheet initially treated as described above results in a much more satisfactory lamination of that film. Second, and most importantly, it has been found that considerably less adhesive is required with a sheet treated in this manner. Further, it has also been found that aqueous-based adhesives may be substituted for the solvent-based adhesive previously used for these purposes.

We claim:

1. A method for laminating a thin film onto a rough, porous surface of a sheet of wood, particle board, fiber board and the like of the type having resins therein, comprising the steps of:
   providing a pair of opposing members, each disposed so as to define a continuous pressure line therebetween;
   providing means for moving one of said members toward and away from the other member so as to permit variation of the space between said two members;
   feeding said sheet into said space in a first direction;
   feeding said film onto said surface and with said sheet in said first direction;
   applying pressure between said two members in an amount substantially above 50 lbs. per lineal inch along said pressure line and against said film-sheet combination, and less than 400 lbs. per lineal inch in order to effect the desired bonding of said film to said sheet without destroying said sheet;
   heating said film-sheet combination while between said members to render said resins amorphous; and wherein
   said amorphous resins are smoothed under pressure to calendar said rough, porous surface of said sheet to facilitate lamination of said film thereto.

2. The method recited in claim 1 wherein said first direction is substantially transverse to said pressure line.

3. The method recited in claim 2 wherein each said member is formed of a substantially incompressible material.

4. The method recited in claim 3 wherein the hardness of said members is substantially equal to that of steel.

5. The method recited in claim 4 wherein said members comprise steel.

6. The method recited in claim 4 wherein said members comprise a pair of parallel, cylindrical rollers.

7. The method recited in claim 6 wherein said pressure line is parallel with the axis of said cylindrical rollers.

8. The method recited in claim 7 wherein said rollers are hollow, said heating step comprising circulating a heated fluid in said hollow rollers to heat the periphery thereof, to thereby heat said film-sheet combination along said pressure line during passage between said rollers.

9. A method for laminating a thin film onto a rough, porous surface of a sheet of wood, particle board, fiber board and the like of the type having resins therein, comprising the steps of:
   providing a pair of opposing and substantially parallel cylindrical steel rollers defining a continuous pressure line between the outer cylindrical surfaces thereof;
   feeding said sheet between said rollers in a first direction substantially transverse to said pressure line;
   feeding said film onto said sheet surface and with said sheet in said first direction;
   applying relative pressure between said two rollers along said pressure line during passage of said film-sheet combination therebetween, said pressure being in an amount to sufficiently compress said sheet to effect complete bonding of said film to said sheet surface, but in an amount less than that which destroys said sheet;
   heating said film-sheet combination while between said rollers; and wherein
   said pressure and heat being sufficient to render said resins in said sheet amorphous, whereby said resins are smoothed to calendar said rough, porous surface of said sheet to facilitate lamination of said film thereto.

10. The method recited in claim 9 further comprising the step of passing said film across a portion of the cylindrical surface of one of said rollers prior to feeding said film onto said sheet surface.

11. The method recited in claim 9 wherein said heating step comprises circulating a heated fluid into said rollers to heat the periphery thereof, to thereby heat said film-sheet combination along said pressure line during passage between said rollers.

12. The method recited in claim 9 wherein said heating step comprises heating the cylindrical surface of at least one of said rollers to a temperature substantially above 300 degrees Fahrenheit.

13. The method recited in claim 12 wherein said temperature is in a range between 375—425 degrees Fahrenheit.

14. The method recited in claim 12 further comprising said pressure is between 50 to 400 lbs. per lineal inch along said pressure line.

15. A method for calendaring a rough, porous surface of a sheet material such as wood, particle board, fiber board and the like, and thereafter laminating a thin film onto said calendared surface; comprising the steps of:

providing a pair of opposing and substantially parallel cylindrical steel rollers defining a continuous pressure line between the outer cylindrical surfaces thereof;

feeding said sheet between said rollers in a first direction substantially transverse to said pressure line;

applying pressure between said two rollers in an amount substantially above 50 lbs. per lineal inch along the pressure line and against the surface of said sheet, and less than 400 lbs. per lineal inch;

heating the cylindrical surface of at least one of said rollers to a temperature substantially above 300 degrees Fahrenheit, in order to elevate the temperature of said rough, porous surface of said sheet material to thereby seal and smooth said surface such that said surface is substantially non-porous and calendared with respect to the rough, porous surface of said sheet prior to treatment; and thereafter applying said thin film to said calendared surface under heat and pressure to facilitate lamination of said film to said calendared surface.

16. A method for laminating a thin film onto a relatively rough, porous surface of a sheet of a compressible material of wood, particle board, fiberboard and the like of the type having resins therein. comprising the steps of:

providing a pair of opposed, substantially parallel cylindrical steel rollers defining a continuous pressure line between the outer surfaces thereof;

feeding said sheet between said rollers in a first direction which is substantially transverse to said pressure lines;

feeding said film onto said sheet surface and with said sheet in first direction;

applying relative pressure between said two rollers along said pressure line during passage of said film-sheet combination therebetween, said pressure being in an amount to compress said sheet to effect complete bonding of said film to said sheet surface, but in an amount less than that which would cause distruction of said sheet;

heating said film-sheet combination while between said rollers; and wherein said pressure and heat being sufficient to render said resins amorphous, whereby said amorphous resins are smoothed under pressure to calendar said relatively rough porous surface of said sheet to facilitate lamination of said film hereto.

17. A method for calendaring a rough, porous surface of a sheet material such as wood, particle board, fiber board, and the like of the type having resins therein, and thereafter laminating a thin film to said calendared surface, said method comprising the steps of:
    (a) providing a pair of opposing cylindrical rollers defining a pressure line between the outer cylindrical surfaces thereof;
    (b) heating said rough, porous surface of said sheet material to a temperature sufficient to render said resins amorphous;
    (c) feeding said sheet between said rollers in a first direction substantially transverse to said pressure line, and applying relative pressure between said rollers in an amount which is sufficient to smooth said amorphous resins; and thereafter
    (d) applying said thin film to said calendared surface under heat and pressure to facilitate lamination of said thin film to said calendared surface.

18. The method recited in claim 17 wherein said pressure-applying step comprises applying pressure against said rough, porous surface in excess of 50 pounds per lineal inch.

19. The method recited in claim 17 wherein said rollers comprise an incompressible material.

20. The method recited in claim 17 wherein said heating step comprises heating said rollers to a temperature in excess of 300° F.

21. A method for laminating a thin film onto a rough, porous surface of a sheet of wood, particle board, fiberboard, and the like of a type having resins therein, said method comprising the steps of:
    (a) applying heat to said rough, porous surface of said sheet to render said resins amorphous;
    (b) applying pressure to said rough, porous surface of said sheet to smooth said amorphous resins and calendar said rough, porous surface;
    (c) feeding said calendared-surface sheet through opposing members in a first direction;
    (d) feeding said thin film onto said calendared surface of said sheet and through said opposing members in said first direction;
    (e) applying pressure between said members; and
    (f) applying heat to said film-sheet combination while under pressure between said members, whereby said film is laminated to said calendared surface.

* * * * *